Sept. 19, 1950 A. GREINER 2,523,015
GLASS TUBE BENDING METHOD AND APPARATUS
Filed July 8, 1944
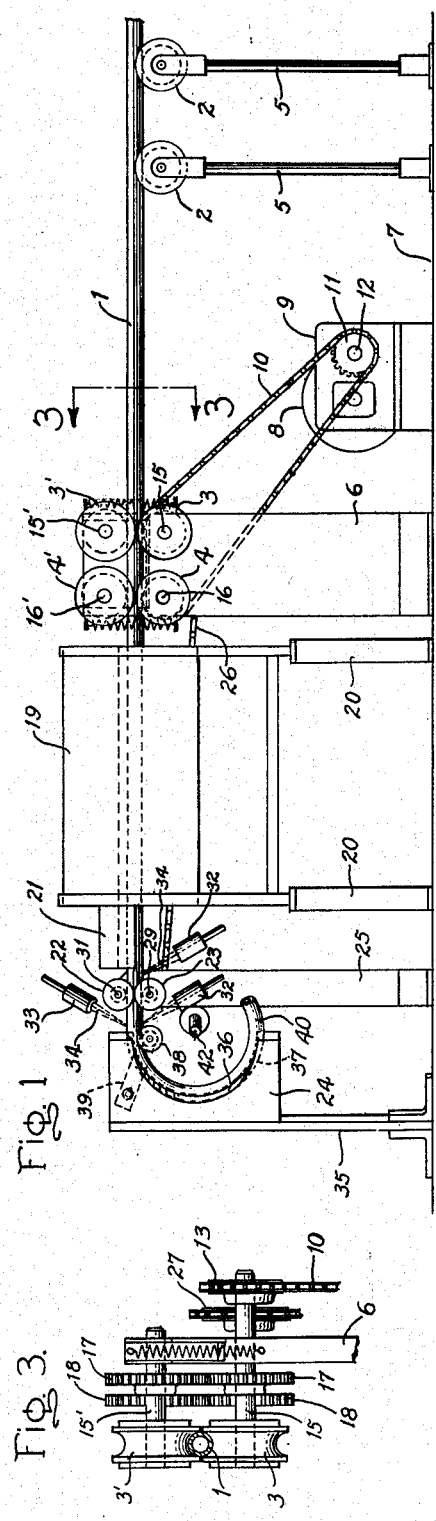
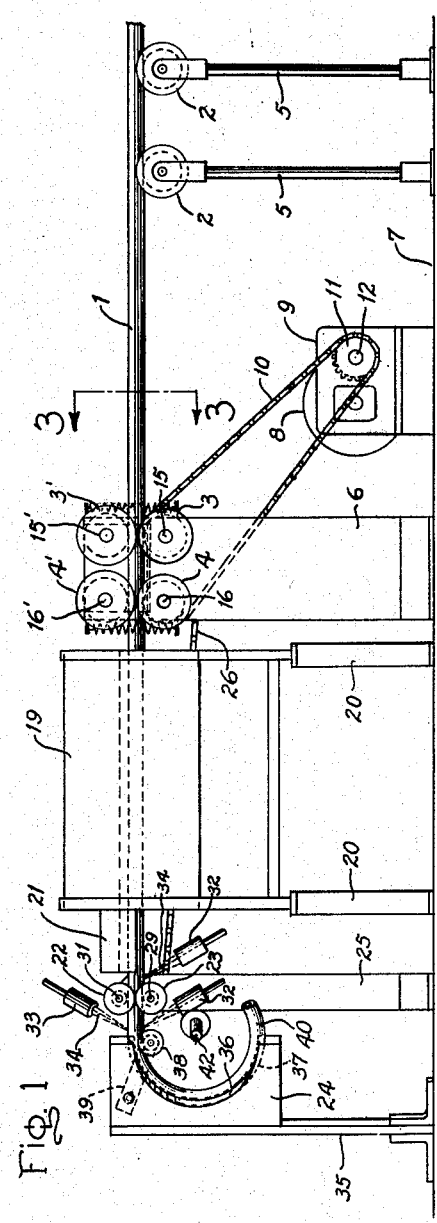
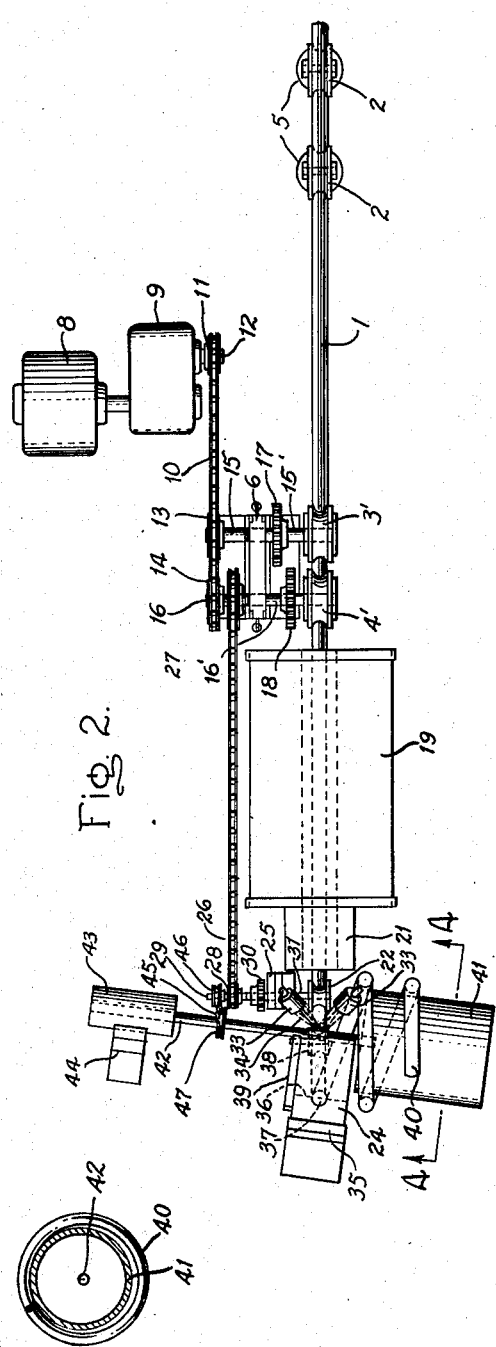
Inventor:
Alfred Greiner:
by John H Anderson
His Attorney Patented Sept. 19, 1950

2,523,015

UNITED STATES PATENT OFFICE 2,523,015

GLASS TUBE BENDING METHOD AND APPARATUS

Alfred Greiner, Cleveland Heights, Ohio, assignor to General Electric Company, a corporation of New York Application July 8, 1944, Serial No. 545,268

9 Claims. (Cl. 49—7)

My invention relates, in general, to method and apparatus for bending glass tubing into helical or other curved shapes. The invention is particularly suitable for coiling glass tubing which has been previously coated internally with a layer of fluoroescent material.

One object of my invention is to provide a method and apparatus for bending glass tubing into true arcuate or spiral configuration without deforming the cross-sectional shape of the tubing.

Another object of my invention is to provide a method and apparatus for continuously coiling glass tubing without deforming the cross-sectional shape thereof.

Further objects and advantages of my invention will appear from the following description of a species thereof and from the accompanying drawing in which:

Fig. 1 is a diagrammatic elevation of a glass tube coiling machine comprising my invention; Fig. 2 is a diagrammatic plan view of the said machine; Fig. 3 is a transverse section of the line 3—3 of Fig. 1; and Fig. 4 is a section on the line 4—4 of Fig. 2.

Referring to the drawings, the glass tubing 1 to be coiled is supported in a horizontal position by one or more grooved support rollers 2 which guide the glass tubing between a double set of opposite, grooved feed rollers 3, 3' and 4, 4' which are spring-pressed against the tubing. The support rollers 2 and feed rollers 3, 3' and 4, 4' are mounted on brackets 5 and 6 fastened to a table or stand 7. The feed rollers 3, 3' and 4, 4', which may be faced with "Transite" or some other suitable plastic material, are rotated at the desired speed by suitable means, such as by an electric motor 8 and speed reducer 9 which drives the feed rollers through a chain 10 connecting a sprocket 11 on the speed reducer output shaft 12 with sprockets 13, 14 on the shafts 15, 16 of the two lowermost feed rollers 3 and 4. The upper and lower rollers of each pair of feed rollers are geared together by means of intermeshing gears 17, 17 and 18, 18 mounted on the roller shafts.

The feed rollers 3, 3' and 4, 4' frictionally engage and advance the glass tubing 1 at a relatively slow and uniform rate through a heating zone preferably provided by an oven or furnace 19, such as an electric furnace, supported by brackets 20 fastened on the table 7. The electric furnace 19 effects a general heating of the glass tubing 1 to a temperature somewhat below, for instance 100° C. or so below, the softening point of the glass of which the tubing is made. Upon leaving the electric furnace 19 the glass tubing 1 passes beneath an electric heating shoe 21 supported from the furnace 19. The said electric shoe 21 serves to additionally heat the upper side or half of the glass tubing, such additional localized heating being advisable for the reason that most of the stretching of the glass, during the ensuing bending operation, takes place at the upper side of the tubing.

After emerging from beneath the supplementary heating shoe 21, the glass tubing 1 passes between a pair of grooved power-driven guide rollers 22, 23 which guide the advancing glass tubing into a reshaping mold or die 24 where the plastic tubing is bent into spiral or other curved shape. The guide rollers 22, 23 are mounted on a bracket 25 fastened on the table 7 and are driven by a chain 26 connecting a sprocket 27 on the feed roller shaft 16 with a sprocket 28 on the lower guide roller shaft 29. The guide rollers 22, 23 are geared together by means of intermeshing gears 30 mounted on the roller support shafts 29, 31.

Just before it enters the mold or die 24, the glass tubing 1 passes through a supplementary heating zone wherein the glass tubing is further heated just up to the point where it becomes sufficiently softened and pliable to be bent. The supplementary heating zone is preferably provided by a group of gas burners 32, 33 which are suitably supported on the table 7 and which direct ribbon-shaped gas fires 34 against the advancing glass tubing. Two or more burners 32 may be diposed beneath the tubing, one located just ahead and the other just beyond the guide rollers 22, 23, to heat the underside of the tubing. Likewise, two or more burners 33, located just beyond the guide rollers 22, 23 and disposed above and angled to the tubing 1, may be used to heat the upper side of the glass tubing.

The reshaping mold or die 24 into which the glass tubing is guided by the rollers 22, 23, comprises a block of suitable material, such as iron, supported from the table 7 by a bracket 35. The side of the mold facing the advancing glass tubing 1 is hollowed out to provide a concave semi-cylindrical surface or cavity 36 which is formed with a tube-receiving groove 37 of one-half turn (180 degrees) arcuate length. The groove 37 may follow either a helical or a circular path, depending upon the shape desired to be given the glass tubing. A circularly-shaped forming groove, however, can be used only to bend the tubing into somewhat less than a full circle since otherwise the bent front end of the tubing would interfere with the unbent rear portions of the tubing. The cross-sectional shape of the groove 37 conforms to that of the glass tubing, the groove depth and width being substantially the same as the radius and diameter, respectively, of the glass tubing. A grooved support roller 38, located immediately inward of the mouth of the reshaping groove 37 and mounted on an arm 39 fastened to the side face of the mold 24, serves to support the glass tubing just after it enters the groove and starts to bend.

While not necessary, the mold 24 is preferably disposed with the axis of its semi-cylindrical surface 36 extending horizontally and with the upper end or mouth portion of the forming groove 37 tangentially aligned with the glass tubing 1 as it emerges from between the guide rollers 22, 23. Where the forming groove 37 is of helical shape, the mold 24 is disposed at an angle, relative to the straight tubing 1, corresponding to the pitch of the said groove (as shown in Fig. 2) so as to longitudinally align the first 90 degrees or so of the length of the groove with the advancing glass tubing.

Upon being pushed into engagement with the wall of the reshaping groove 37, the advancing glass tubing, being in a pliable state at such a time, is progressively bent into a circular or helical shape conforming to the shape of the said groove. In the course of its continued passage through the mold groove 37, the glass tubing gradually cools so that by the time it leaves the mold it has cooled and rigidified sufficiently to thereafter retain, of itself, its newly formed shape. If desired, a stream of air may be directed against the coiled tubing, as it leaves the mold, to enhance the cooling thereof.

Where the glass tubing is to be bent into helical shape, suitable means are preferably provided for temporarily supporting the helically-coiled portion 40 of the tubing for a short period of time following its emergence from the mold 24. As shown in Fig. 2, such support means is preferably in the form of a revolving cylinder 41 mounted adjacent one side of the mold 24 in proper position to pick up and receive the coiled tubing 40 therearound. The cylinder 41, which is preferably covered with a heat resisting material such as asbestos, is of slightly smaller diameter than the inside diameter of the coiled tubing 40 so that the latter can slide freely therealong. The cylinder 41 is mounted on a shaft 42 the axis of which is parallel to, but offset slightly above the axis of the coiled tubing 40 as the latter leaves the mold so that the coiled tubing engages and rests against the top portion only of the cylinder. The cylinder support shaft 42 is journalled in a bearing 43 fastened to a bracket 44 mounted on the table 7. Rotation of the cylinder 41 is produced by means of a spring-belt 45 connecting a pulley 46 on the lower guide roller shaft 29 with a pulley 47 on the cylinder shaft 42.

Where the glass tubing 1 is in the form of a tube of a determinable length or an unbased fluorescent lamp, suitable pusher means must be employed for pushing the tube or lamp completely through the reshaping mold. Such pusher means may be conveniently constituted by the succeeding glass tube or lamp which is to be fed through the reshaping apparatus, a suitable spacer plug being temporarily fitted between the adjacent ends of the glass tubes or lamps for transmitting the pushing force to the preceding tube or lamp.

The method and apparatus according to the invention may be advantageously used to continuously coil glass tubing directly following its formation into tubing by a continuous tube drawing process such as the well-known "Danner" process. In such case, the helically coiled glass tubing may be suitably severed into coils of any given length.

What I claim as new and desire to secure by Letters Patent of the United States is:

1. Apparatus for bending glass tubing into curved shape comprising, a concave forming die having a continuously extending concave die surface of parti-cylindrical shape, means to support the tubing and to feed it longitudinally into the die in a direction substantially tangent to and transversely of the axis of the concave die surface and push it through the die against the said concave die surface to coil the tubing, and accurately controllable localized heating means adapted to heat the tubing to a pliable condition, said heating means being mounted adjacent the die and arranged to apply heat to a localized portion of and completely around the tubing immediately adjacent the mouth of the die to progressively soften the tubing and place it in final condition for bending just before its entry into the die.

2. Apparatus for bending glass tubing into helical shape comprising, a forming die having a continuously extending helically grooved concave die surface of parti-cylindrical shape, means to support the tubing and to feed it longitudinally into the die in a direction substantially tangent to and transversely of the axis of the concave die surface and push it through the die against the said die surface and through the helical groove therein to coil the tubing, and accurately controllable localized heating means adapted to heat the tubing to a pliable condition, said heating means being mounted adjacent the die and arranged to apply heat to a localized portion of and completely around the tubing immediately adjacent the mouth of the die to progressively soften the tubing and place it in final condition for bending just before its entry into the die.

3. Apparatus for bending glass tubing into curved shape comprising, heating means adapted to heat the tubing to a temperature below the softening point thereof, feed means to support and advance the tubing longitudinally through said heating means, a concave die positioned to receive the advancing heated tubing substantially tangent to its concave die surface and into and through which the tubing is pushed by said feed means to coil the tubing, and supplementary heating means mounted adjacent the die to heat the tubing to a pliable condition, said supplementary heating means being arranged to apply heat to a localized portion of the tubing immediately adjacent the mouth of the die whereby the tubing is progressively softened just before its entry into the die.

4. Apparatus for bending glass tubing into curved shape comprising, a forming die provided with a continuously extending concave parti-cylindrical die surface having a tube-receiving groove therein extending transversely of the axis of said surface, means to support the tubing and to feed it longitudinally into the die groove in a direction transversely of the axis of the said concave die surface and substantially tangent to an end of said groove and push it therethrough against the said concave die surface to coil the tubing, and accurately controllable localized heating means adapted to heat the tubing to a pliable condition, said heating means being mounted adjacent the die and arranged to apply heat to a localized portion of and completely around the tubing immediately adjacent the mouth of the die to progressively soften the tubing and place it in final condition for bending just before its entry into the said groove.

5. Apparatus for bending glass tubing into helical shape comprising, a forming die provided with a continuously extending concave particylindrical die surface having a tube-receiving groove therein defining a portion of a helical path, means to support the tubing and to feed it longitudinally into the die groove in a direction transversely of the axis of the said concave die surface and substantially tangent to an end of said groove and push it therethrough against the said concave die surface to coil the tubing, and accurately controllable localized heating means adapted to heat the tubing to a pliable condition, said heating means being mounted adjacent the die and arranged to apply heat to a localized portion of and completely around the tubing immediately adjacent the mouth of the die to progressively soften the tubing and place it in final condition for bending just before its entry into the die.

6. Apparatus for bending glass tubing into helical shape comprising, a helically grooved concave die, means to support the tubing and to feed it longitudinally into the die in a direction substantially tangent to the concave helical groove surface and push it through the die to coil the tubing, heating means adapted to heat the tubing to a pliable condition, said heating means being mounted adjacent the die and arranged to apply heat to a localized portion of the tubing immediately adjacent the mouth of the die whereby the tubing is progressively softtened just before its entry into the die, a cylindrical support member rotatably mounted adjacent the die in position to receive the coiled tubing therearound as it leaves the die, said cylindrical support member having a diameter slightly less than the inside diameter of the finished helically coiled tubing and being mounted with its top side substantially aligned with the underside of the top of the helically coiled tubing outward of the die so that the said coiled tubing rests on the said support member, and means for rotating the said cylindrical support member in the direction of the progressive rotational movement of the helically coiled tubing around its helix axis as it leaves the die.

7. Apparatus for bending glass tubing into curved shape comprising, a furnace, feed rollers to support and advance the tubing longitudinally through said furnace to heat the tubing to a temperature below the softening point thereof, a concave die positioned adjacent the discharge end of said furnace to receive the heated tubing substantially tangent to its concave die surface and into and through which the tubing is pushed by said feed rollers to coil the tubing, and gas burners located between said furnace and die and arranged to direct fires against a localized portion of the tubing immediately adjacent the mouth of the die to thereby progressively soften the tubing just before its entry into the die.

8. The method of bending glass tubing which comprises, introducing the glass tubing longitudinally into a concave die in a direction substantially tangent to the concave die surface of the die and pushing it through the die while locally heating the tubing progressively to a pliable condition immediately outward of the mouth of the die.

9. The method of bending glass tubing into helical shape which comprises, introducing the glass tubing longitudinally into a helically grooved concave die in a direction substantially tangent to the concave helical groove surface of the die and pushing it through the die while locally heating the tubing progressively to a pliable condition immediately outward of the mouth of the die.

ALFRED GREINER.

REFERENCES CITED

The following references are of record in the file of this patent:

UNITED STATES PATENTS

| Number | Name | Date |
|---|---|---|
| 603,175 | Collins | Apr. 26, 1898 |
| 1,874,012 | Hotchner | Aug. 30, 1932 |
| 2,006,389 | Fuchs | July 2, 1935 |
| 2,113,428 | Hanna | Apr. 5, 1938 |
| 2,208,958 | Brown et al. | July 23, 1940 |

FOREIGN PATENTS

| Number | Country | Date |
|---|---|---|
| 17,797 | Great Britain | A. D. 1887 |
| 396,018 | Great Britain | Oct. 19, 1931 |